United States Patent
Griggs et al.

(10) Patent No.: US 9,877,492 B1
(45) Date of Patent: Jan. 30, 2018

(54) ADDITIONAL CASING FOR SLACK FILLING

(71) Applicant: Tipper Tie, Inc., Apex, NC (US)

(72) Inventors: Samuel D. Griggs, Apex, NC (US); William M. Poteat, Fuquay Varina, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 15/633,324

(22) Filed: Jun. 26, 2017

(51) Int. Cl.
*A22C 11/00* (2006.01)
*A22C 11/02* (2006.01)

(52) U.S. Cl.
CPC ...... *A22C 11/0227* (2013.01); *A22C 11/0254* (2013.01)

(58) Field of Classification Search
CPC ......... A22C 11/00; A22C 11/08; A22C 11/02; A22C 11/0209; A22C 11/0227; A22C 11/0245
USPC ........... 452/21–26, 30–32, 35–37, 46–48, 51
See application file for complete search history.

(56) References Cited

U.S. PATENT DOCUMENTS

| | | | |
|---|---|---|---|
| 4,023,238 A | 5/1977 | Phares | |
| 4,434,528 A * | 3/1984 | Niedecker | A22C 11/02 452/37 |
| 4,563,792 A * | 1/1986 | Niedecker | A22C 11/02 452/31 |
| 4,675,945 A | 6/1987 | Evans et al. | |
| 4,847,953 A | 7/1989 | Evans et al. | |
| 4,970,758 A * | 11/1990 | Naples | A22C 11/0245 452/37 |
| 5,074,386 A | 12/1991 | Evans | |
| 5,167,567 A | 12/1992 | Evans | |
| 5,203,735 A * | 4/1993 | Stanek | A22C 11/0254 452/37 |
| 5,273,482 A * | 12/1993 | Beckman | A22C 11/0281 138/118.1 |
| 6,401,885 B1 | 6/2002 | Whittlesey | |
| 6,920,738 B2 | 7/2005 | Wilkins et al. | |
| 7,306,511 B2 | 12/2007 | Whittlesey et al. | |
| 7,322,164 B2 | 1/2008 | Whittlesey et al. | |
| 7,479,057 B2 * | 1/2009 | Waldstaedt | A22C 11/105 452/32 |
| 7,488,243 B2 | 2/2009 | Wince et al. | |
| 7,641,542 B2 * | 1/2010 | Haschke | A22C 11/005 452/24 |
| 7,650,729 B2 | 1/2010 | Whittlesey | |
| 7,914,364 B2 * | 3/2011 | Mysker | A22C 11/0209 452/32 |
| 8,371,909 B2 | 2/2013 | Lowder et al. | |

\* cited by examiner

*Primary Examiner* — Richard Price, Jr.
(74) *Attorney, Agent, or Firm* — Christensen O'Connor Johnson Kindness PLLC

(57) ABSTRACT

A casing extender apparatus (30) includes a first actuator assembly (50) to raise and lower a pair of spaced-apart spanners (52a and 52b) from a position above the bunched casing rope (24) to a position adjacent the rope. A second actuator assembly (54) lowers a drawing member (56) to a position beneath the slack casing rope and then draws the slack casing rope upwardly between the spanners to form a loop (60) of slack casing rope upwardly between the spanners (52a and 52b).

20 Claims, 13 Drawing Sheets

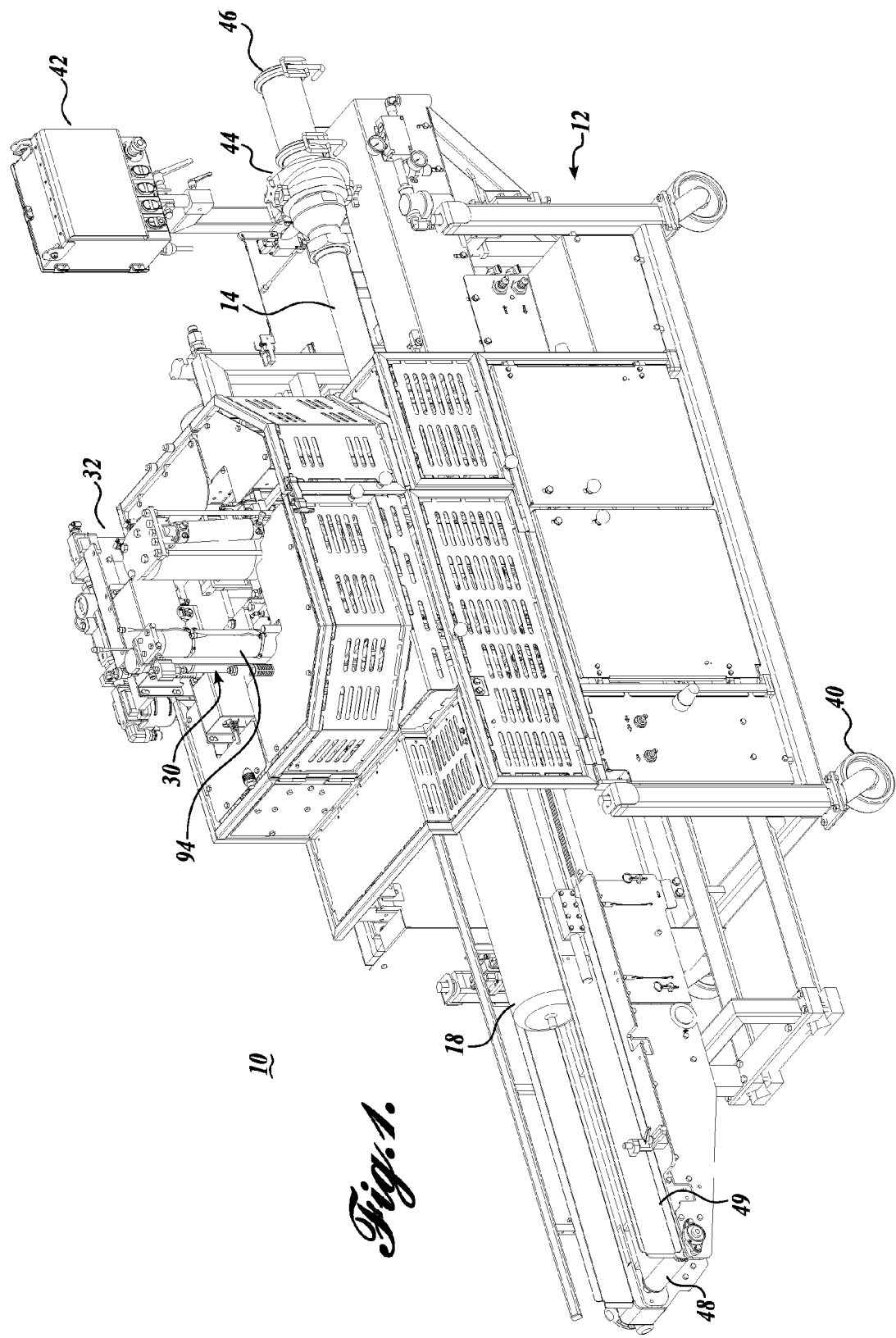

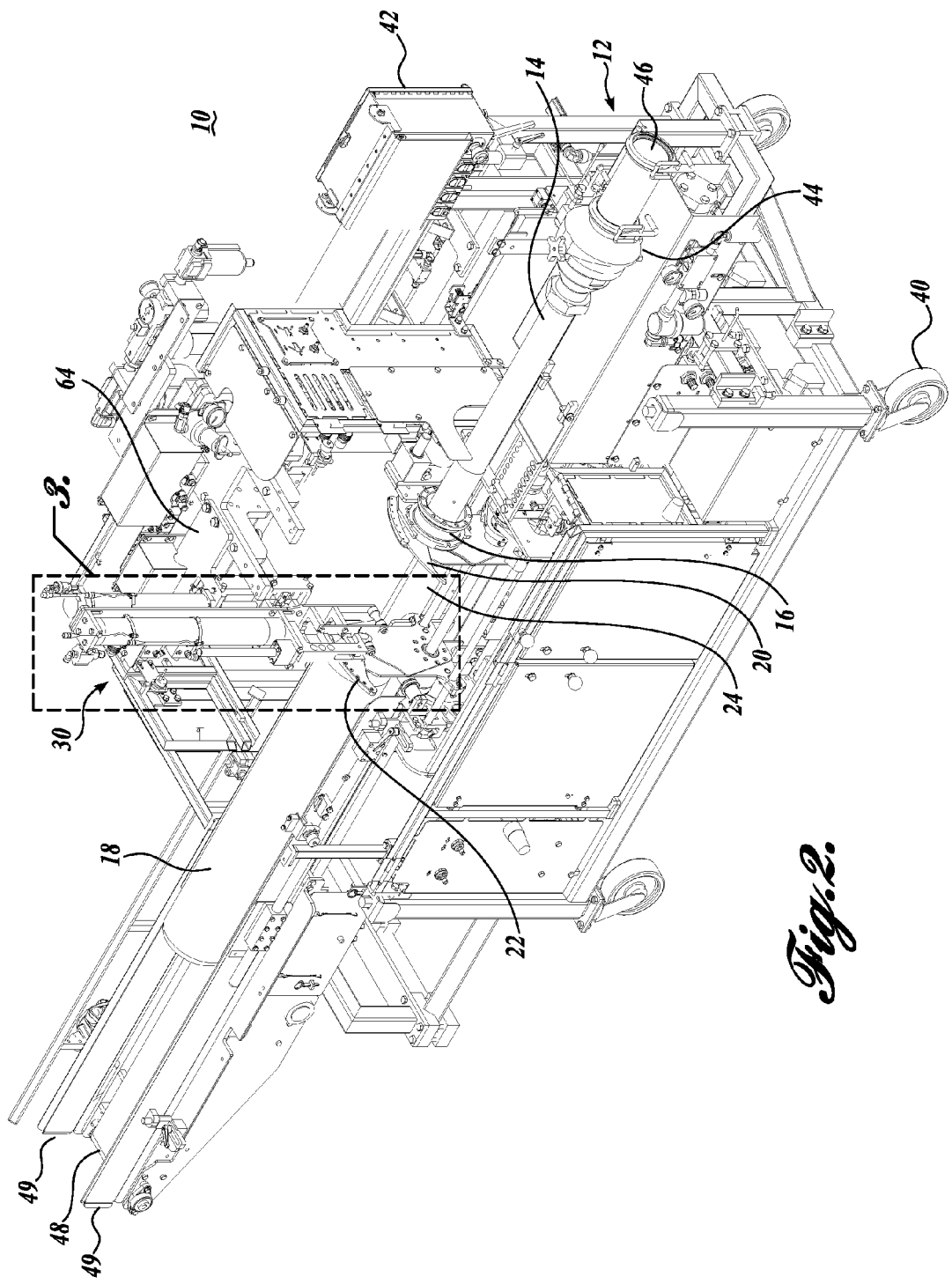

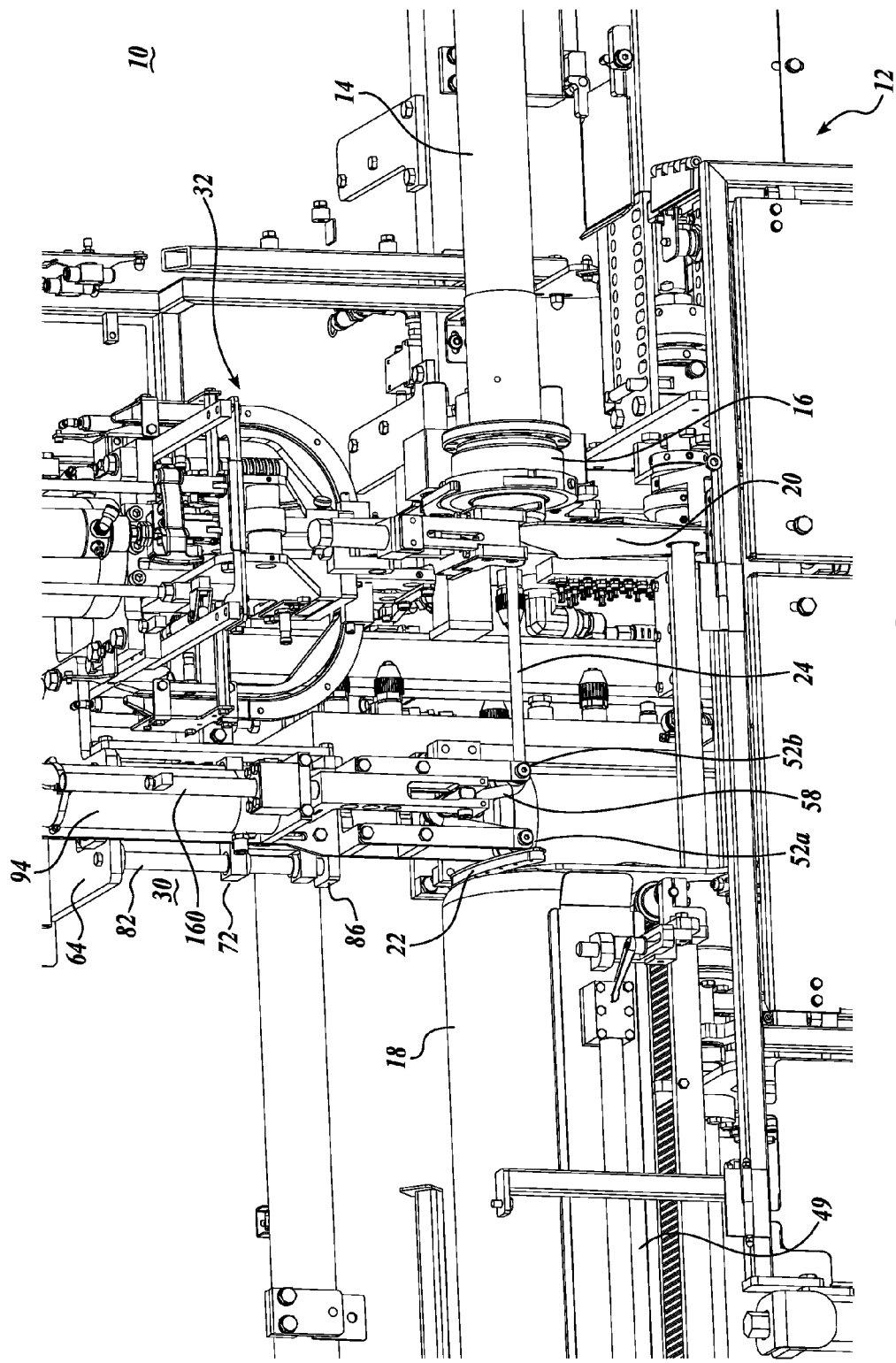

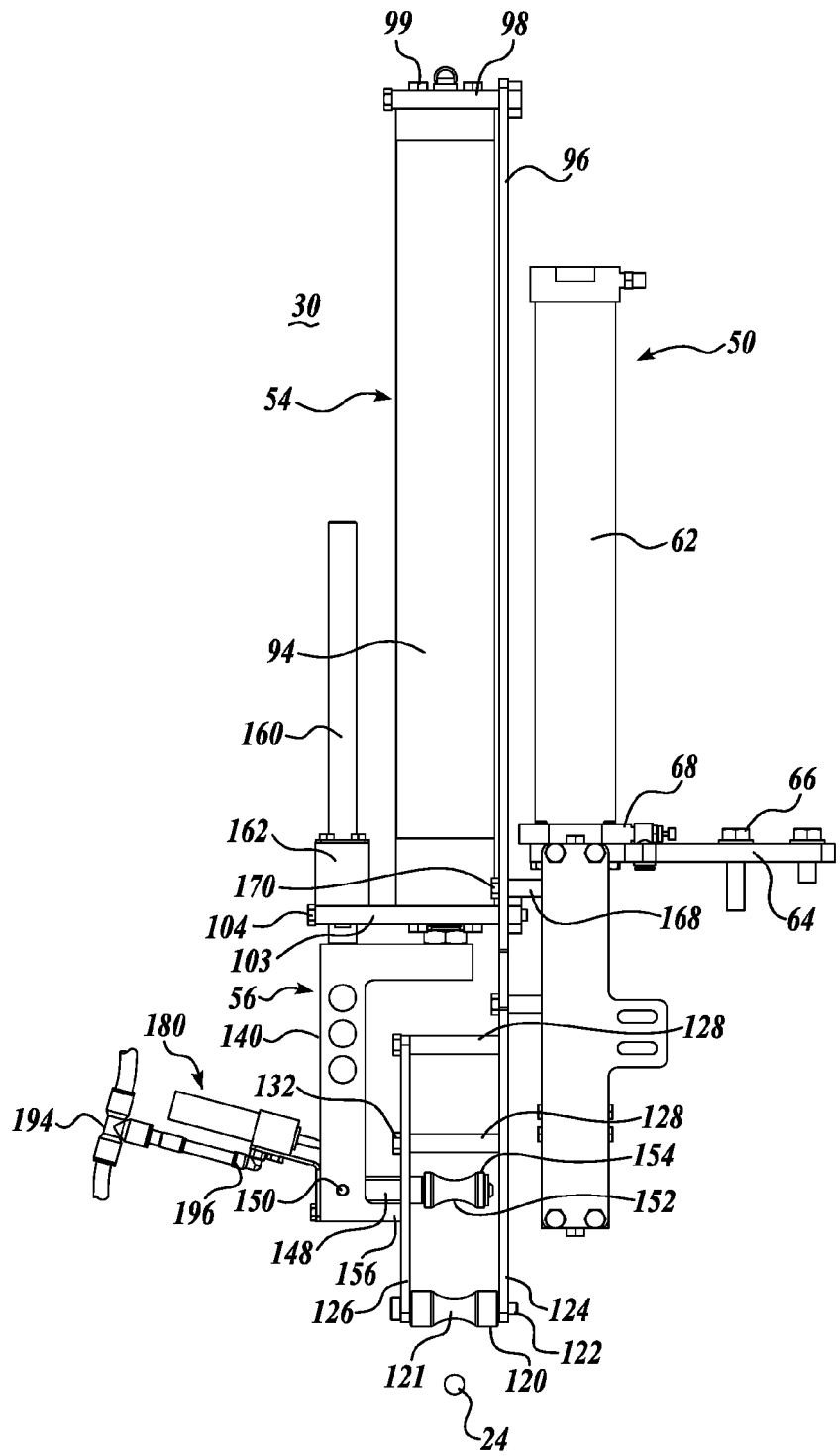

ADDITIONAL CASING FOR SLACK FILLING

BACKGROUND

The present disclosure relates to food processing systems and more particularly to stuffing machines for stuffing sausages and other stuffed meats as well as other types of stuffed food products into a casing. In such machines, the food product to be stuffed is pumped through a stuffing horn to be fed into a casing or film that is sheared over the exterior of the stuffing horn to form a length or log of stuffed food product. While the stuffing material is pumped through the horn, both the casing and stuffing material pass through a casing brake assembly, which controls the flow of the casing relative to the flow of the stuffing material. As such, the product diameter and casing tension are maintained at a high degree of uniformity. The stuffing material fills the casing and the casing maintains the material under slight pressure. The casing brake permits the casing to leave the horn under uniform tension.

Adjacent the casing brake, a voider voids the stuffed casing and gathers the casing or film into a small diameter rope. Then a clipping mechanism clips the stuffed casing to define the end of the exiting product. Commonly, two clips are applied, one to close off the filled casing and the other to define the leading end for the next product case. The casing rope material extending between the two applied clips is then cut.

The voider consists of two pairs of voider plates, an upstream plate pair and a downstream plate pair. During the stuffing of the casing, the voider plates are positioned side by side just downstream of the end of the horn, and the plates are in open position cooperatively creating a large opening through which the filled casing passes. Once the casing is filled to a desired extent, the voider plates of each pair close by rotating toward each other in a well-known manner, which squeezes the casing void of stuffing product and gathers the casing into a small diameter rope. Next, the downstream pair of closed voider plates moves axially forward and away from the upstream voider plates. This creates a space for the clipper to advance toward the gathered casing rope to apply closure clips thereto.

The downstream clip need not be applied adjacent the end of the stuffed casing, but can be applied further upstream thereby to provide slack casing that may be filled by the stuffing material when the stuffing material is formed in a particular shape and/or processed, such as by cooking. When the casing is being filled, the resulting log is circular in shape. However, when the desired end product is not round, but perhaps instead square or rectangular, the final product after cooking requires extra casing in order to create the square or rectangular shape.

Stuffing machines are able to pull a fixed amount of extra casing rope or film after the stuffing operation has been completed due to the separation of the downstream voider plates from the upstream voider plates. However, if longer product logs are desired, additional film or casing is required, which existing packaging/stuffing machines are not able to provide. The present disclosure is directed at creating additional slack cashing or film without having to increase the voider spread distance, which would require enlarging the packaging/stuffing machines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides an apparatus for a packaging machine for packaging foodstuff ejected from a stuffing horn into a casing, wherein the apparatus increases the length of slack casing extending between the stuffing horn on which the casing is sheared and a filled segment of the casing moved downstream from the stuffing horn, comprising:
  (a) a pair of spaced-apart spanner members;
  (b) an actuator system operable to position the pair of spaced-apart spanner members adjacent the slack casing and spaced-apart along the length of the slack casing;
  (c) a drawing member; and
  (d) the actuator system operable to move the drawing member laterally to the length of the slack casing away and from the spanner members to draw the casing off the horn as a loop in a direction away from the length of the slack casing.

In a further aspect of the present disclosure, the drawing member is nominally positioned adjacent the spanner members.

In a further aspect of the present disclosure, the actuator system draws the drawing member between the spanner members.

In a further aspect of the present disclosure, the actuator system draws the drawing member in a direction transversely to the length of the slack casing.

In a further aspect of the present disclosure, the spanner members comprise rollers to engage the slack casing.

In a further aspect of the present disclosure, the drawing member comprises a roller to engage the slack casing.

In a further aspect of the present disclosure, the drawing member comprising a roller to engage the slack casing.

In a further aspect of the present disclosure, the actuator system comprising a first actuator operable to move the spanner members toward and away from the slack casing.

In a further aspect of the present disclosure, the actuator system comprising a second actuator operable to move the drawing member laterally relative to the slack casing.

In a further aspect of the present disclosure the second actuator is adapted to be carried by the first actuator.

The present disclosure also provides an apparatus for extending the length of slack casing at the end of a stuffed product log produced after the product has been stuffed into a casing at a stuffing location and then the product log has been advanced downstream a distance from the stuffing location to create a length of slack casing, the apparatus comprising:
  (a) a pair of spanners spaced apart from each other along the length of the slack casing, the spanners adapted to be moved from a retracted position spaced from the slack casing and an extended position adjacent the slack casing; and
  (b) a drawing assembly comprising an engagement portion operable to engage the slack casing and draw the slack casing as a loop between the spanners in a direction away from the length of the slack casing to increase the length of slack casing between the product log and the stuffing location.

In a further aspect of the present disclosure, the engagement portion of the drawing assembly is nominally spaced away from the slack casing.

In a further aspect of the present disclosure, the engagement portion of the drawing assembly is nominally disposed between the spanners.

In a further aspect of the present disclosure, the drawing assembly comprising a drawing actuator that draws the slack casing away from the spanners.

In a further aspect of the present disclosure, the engagement portion comprising a roller to engage the slack casing.

In a further aspect of the present disclosure, the spanners comprising rollers to engage the slack casing.

A further aspect of the present disclosure comprises a spanner actuator carrying the spanners between the retracted and extended positions.

The present disclosure provides a method for creating slack casing at the trailing end of a product stuffed into a continuous length of casing at a stuffing location, comprising:
  (a) positioning a pair of spanners spaced apart lengthwise of the casing upstream of the stuffed product and laterally adjacent to the casing; and
  (b) drawing the casing as a loop between the spanners in a direction generated laterally to the casing length; and
  (c) clipping the casing at a location between the casing loop and the stuffing location.

The present disclosure further comprises cutting the casing at a location upstream from the location that the casing has been clipped.

The present disclosure further comprises after the casing has been stuffed, moving the spanners to a position laterally adjacent the casing from a location retracted from the casing.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a front isometric view of a packaging apparatus or system in accordance with the present disclosure taken from a slight angle looking upstream;

FIG. 2 is a second front isometric view of the packaging apparatus/system taken from a slight angle looking downstream with portions of the apparatus removed to more clearly show the casing slack extender of the present disclosure;

FIG. 4 is a fragmentary front view of the packaging system/apparatus with portions removed to more clearly illustrate the casing extender positioned adjacent a clipper;

FIG. 5b is a side elevational view of FIG. 5a;

FIG. 6b is a side elevational view of FIG. 6a;

FIG. 7b is a side elevational view of FIG. 7a;

FIG. 8b is a side elevational view of FIG. 8a.

DETAILED DESCRIPTION

Figure 3A:
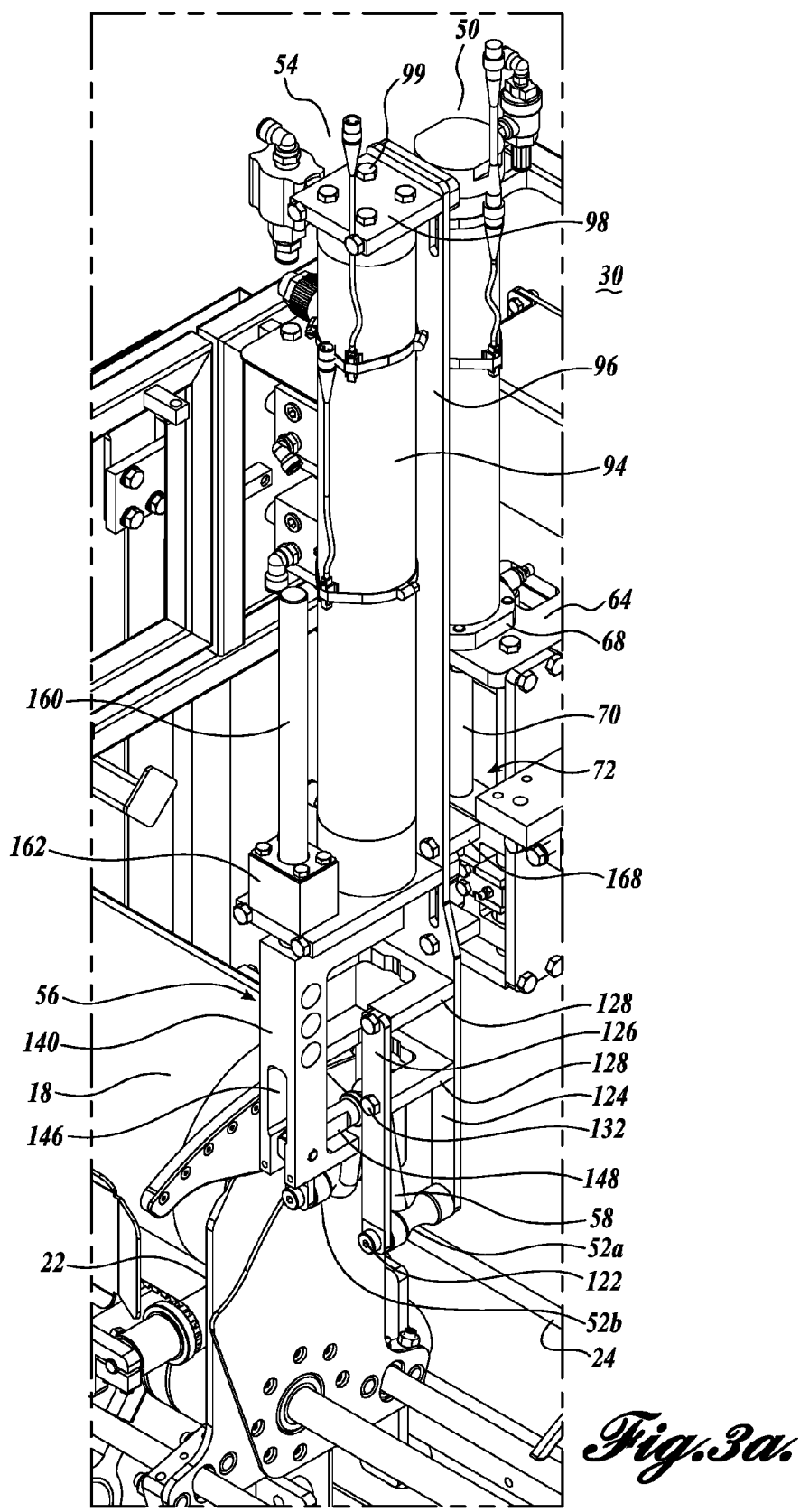
FIG. 3a is an enlarged isometric view of the portion of FIG. 2 which is identified in FIG. 2 as within a dotted line frame.
Figure 3B:
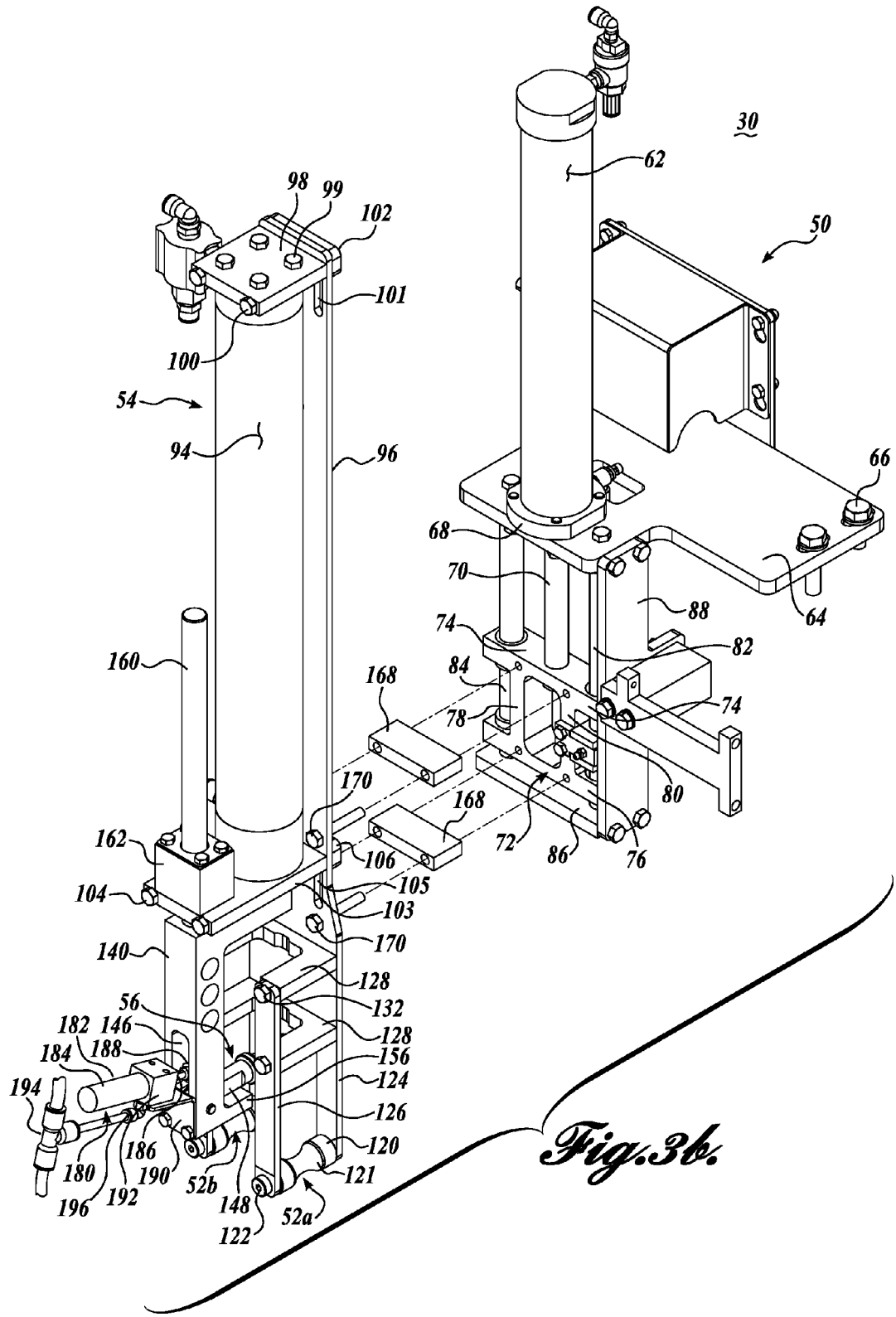
FIG. 3b is a view similar to FIG. 3, but with major portions of the casing extender in exploded position.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "upward," "downward," "right hand," "left hand," "in," "out," "extended," "advanced," "retracted," "proximal," "distal," "above," "below," in front of," "behind," "on top of," and "beneath." These references and other similar references with respect to direction, position, location, etc., in the present application are only to assist in helping describe and understand the present invention and are not intended to limit the present invention to these directions, positions, locations, etc.

The present application may include modifiers such as the words "generally" or "substantially." These terms are meant to serve as modifiers to indicate that the "dimension," "shape," or other physical parameter, in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units are the same or similar are not repeated so as to avoid redundancy in the present application.

Referring initially to FIGS. 1-4, the present disclosure pertains a packaging apparatus or system 10 for packing flowable materials into a casing or film. The apparatus 10 includes a frame structure 12 on which is mounted a product horn 14 through which the flowable product is delivered to the interior of a casing that has been sheared over the horn 14 thereby to create an elongated log 18 of stuffed material.

A brake assembly 16 applies tension between the casing and the horn on which the casing has been sheared so as to provide a requisite level of drag on the casing as it is being stuffed. Once the desired length of the log 18 has been achieved, the casing is voided by an upstream voider plate pair 20 and a downstream voider plate pair 22. The voider plates close about the central longitudinal axis of the horn and the formed product log to void the casing and also bunch the empty casing into a small diameter rope section 24. The downstream voider plate pair 22 is advanced downstream away from the upstream voider plate pair to form a length of slack casing rope 24. Next, a voider extender 30 of the present disclosure is used to extend the length of the slack casing rope 24 so as to provide extra slack casing for the log 18, as is needed if the log is formed into a different cross-sectional shape and then cooked or otherwise thermally processed. A clipper 32 clips the casing rope 24 adjacent the upstream voider plates 20, typically using two closely spaced clips to close off the end of the slack casing 24 and also form the leading end of the casing for the next log to be formed by the apparatus 10. The casing is cut between the two clips and then the formed log 18 transferred on for further processing.

The foregoing aspects of the present disclosure will next be described in more detail. In this regard, the frame 12 is primarily composed of tubular members and cover panels to create a substantially enclosed housing for the apparatus 10. The frame is mounted on wheels 40 so that the apparatus 10 can be moved from location to location as needed. A control panel 42 is provided for operator input and control of the apparatus 10.

As shown in FIG. 2, the longitudinal product horn 14 is supported on the frame 10 in a horizontal orientation. The product horn 14 is pivotal about a pivot joint assembly 44, for example, when shearing casing onto the horn. An exemplary pivot joint is disclosed by U.S. Pat. No. 7,306,511, the disclosure of which is incorporated herein. A connector section 46 is attached upstream from the pivot joint 44 for connection to a source of flowable material to be packaged or encased.

As noted above, a braking assembly 16 is positioned at the exit end of the product horn 14 to apply drag onto the casing as the casing is being filled with the flowable material and also to clamp the casing against the product horn prior to a new log 18 being formed and while the downstream voider plate pair 22 is retracted to a position adjacent the upper voider plate pair after the slack casing has been cut and the associated log 18 transported away.

The log 18 is mounted on a conveyor 48 which carries the log downstream and away from the voider extender 30 after the slack casing or rope 24 has been clipped, as discussed above. Prior to such departure of the log 18, the log is held in place by side plates 49, which can be pressed against the opposite sides of the log while the voider extender 30 is operational. This prevents the log 18 from retracting back upstream as the voider extender pulls on the slack casing as described more fully below.

The clipper 32 is located upstream from the voider extender 30 to apply two clips around the gathered slack casing. The clipper also includes a knife that is automatically extended to cut the slack casing once the two clips have been applied. Examples of exemplary clippers are disclosed in U.S. Pat. Nos. 4,847,953, 4,675,945, 5,074,386, 5,167,567, and 6,401,885, the contents of which are incorporated by reference into the present specification as if recited in full herein.

As discussed above, after the casing has been filled to form log 18 and the log voided, the downstream pair of voider plates 22 advances away from the upstream pair of voider plates 20 to create a length of gathered slack casing or rope (also referenced as "slack casing rope") 24 therebetween. In existing packaging systems, this length of slack casing does not provide sufficient volume for the log 18 when it is reshaped into, for example, a square or rectangular cross section. As is known, a circular cross section requires the least amount of casing per unit length. As such, when the log 18 is formed into a shape other than circular, additional casing is required. Also, the volume of the log may expand when heat treated. Additional casing slack length is achieved by the casing extender 30 for the present disclosure.

Referring primarily to FIGS. 3a-8b, the casing extender apparatus 30 includes in basic form a first actuator assembly 50 mounted on the frame 12 at a location just upstream from the second voider plate pair 22 after it has been extended downstream from the first voider plate pair 20. The first actuator assembly 50 functions to raise and lower a pair of spaced-apart spanners 52a and 52b from a position retracted upwardly above the log 18 as it is being filled, to a lowered position just above the bunched and voided slack casing or rope 24. The first actuator assembly 50 carries a second actuator assembly 54 that in turn advances and retracts a drawing member 56 up and down between the spanners 52a and 52b and thus laterally to the slack casing rope 24. The drawing member 56 is lowered to a position beneath the slack casing rope 24 and then hooks under the slack casing rope and draws it upwardly to form a loop 60 of slack casing rope upwardly above the spanners 52a and 52b. This creates an additional length of slack casing rope 24 thereby to provide sufficient slack casing for the reshaped stuffed log 18. As noted above, once the extra length of slack casing rope 60 has been achieved, the clipper 32 applies two clips to the slack casing rope and then the slack casing rope is cut, which completes a cycle of the packaging apparatus 10.

To describe the casing extender apparatus 30 in greater detail, the first actuator assembly 50 includes a first actuator in the form of a fluid cylinder 62, which is mounted on a horizontal plate 64 secured to a portion of the frame 12 by hardware members in the form of cap screws 66. A mounting ring 68 attaches the lower end of the cylinder 62 to the mounting plate 64. The cylinder 62 is oriented so that its extendible and retractable rod 70 extends downwardly from the cylinder for attachment to a vertically movable carriage 72.

The carriage 72 has upper and lower cross members 74 and 76 spanned by vertical side members 78 and 80. The lower end of the rod 70 is attached centrally to the upper cross members 74. The portions of upper and lower cross members 74 and 76 extending outwardly of the vertical members 78 and 80 have circular openings for closely receiving vertical guide rods 82 and 84 that span between mounting plate 64 at the upper end and a bottom plate 86 at the lower end. The bottom plate 86 is secured to the lower ends of side brackets 88 that span downwardly from the mounting bracket 64 to the bottom plate 86. As will be appreciated, the guide rods 82 and 84 guide the carriage 72 for the vertical movement as the cylinder rod 70 is extended and retracted.

As mentioned above, the second actuator assembly 54 is carried by the first actuator assembly 50. In this regard, the second actuator assembly 54 includes a second actuator in the form of cylinder 94, which is mounted on a vertical mounting plate 96 that is interposed between cylinders 94 and 62. The vertical mounting plate 96 spans substantially the entire height of the second actuator assembly 54. The cylinder 94 is mounted to the mounting plate 96 at its upper end by mounting bracket 98 that extends transversely from the upper end of the mounting plate 96 to overlie the upper end of the cylinder 94. Hardware members in the form of cap screws 100 extend through holes formed in bracket 98, then through vertical slots 101 formed in the vertical mounting plate 96, to threadably engage with a nut plate 102 located on the opposite side of the vertical mounting plate 96.

At the lower end, the cylinder 94 is attached to the mounting plate 96 by a lower bracket 103 that extends transversely outwardly from the mounting plate 96. The bracket 103 is secured to the mounting plate 96 by elongated bolts 104 which extend through clearance holes formed through the bracket 103 and then through vertical slots 105 formed in the mounting plate 96 to engage a threaded nut plate 106. It will be understood that the slots 101 and 105 allow the cylinder 94 to be raised and lowered relative to the mounting plate 96 which in turn adjusts the length of the additional slack casing rope achieved.

The spanners 52a and 52b are mounted at the lower end of the mounting plate 96 to extend transversely to the longitudinal direction of the slack casing rope 24. To this end, the spanners 52a and 52b are in the form of rollers 120 rotatably mounted on axles 122 spanning between the lower end of tangs 124 depending downwardly from bracket 96. The opposite end of the axles 122 are mounted to the lower ends of narrow vertical plates 126 positioned in registry with tangs 124. The upper ends, and also intermediate the ends, of the narrow plates 126 are secured to upper and lower U-shaped standoff brackets 128 that project from the adjacent face of the mounting plate 96. Bolts 132 extend through openings formed in the narrow plates 126 and through clearance holes formed in the side leg portions of the standoff brackets 128 to extend through clearance openings formed in the mounting plate 96. The open space between the side legs of the standoff brackets 128 provide clearance for the drawing member 56 that is operable to raise and lower under the operation of the cylinder 94.

The drawing member 56 is mounted to a generally L-shaped clevis 140. The clevis has an upper horizontal arm section that is attached to the lower end of a rod 144 extending downwardly from the cylinder 94. As perhaps most clearly shown in FIG. 7a, the lower portion of the vertical leg of the clevis 140 has a slot 146 formed therein for receiving the proximal end of a pivot arm 148. The pivot pin 150 extends through aligned close-fitting openings formed in the sides of the clevis lower portion to extend through a clearance hole formed in the pivot arm 148. An axle, not shown, projects from the distal end of the pivot arm 148 to engage through an elongate drawing roller 152 mounted on the axle. The drawing roller has a concave center portion 154 for engaging with and retaining the slack casing rope 24. Likewise, the spanner rollers 120 have concave central portions 121 for engaging with and retaining the slack casing rope.

Figure 7A:
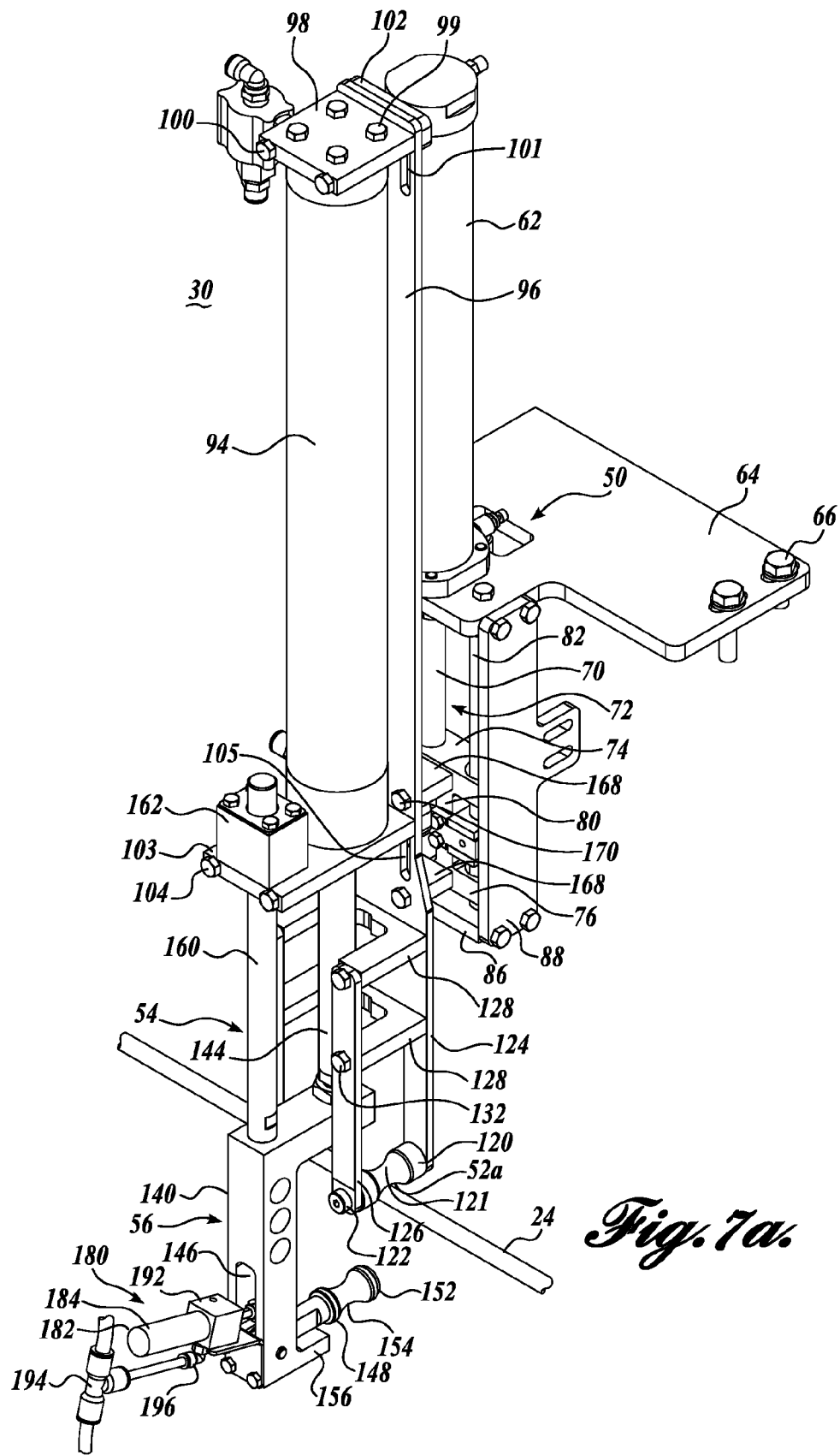
FIG. 7a is an isometric view of FIG. 3 showing the drawing member of the casing extender positioned below the gathered casing rope.

The clevis 140 also includes a transverse stop portion 156 that extends transversely to and beneath the pivot arm 148 when the pivot arm is in horizontal position, as shown in FIG. 7a. It will be appreciated that due to the weight of the roller 152, the pivot arm 148 is nominally disposed or biased in horizontal position and bottomed against the stop 156. However, the pivot arm is capable of rotating about pin 150 upwardly away from the stop 156, for instance when the clevis 140 is lowered so that the roller 152 strikes against the upper surface of the slack casing rope 24.

The clevis 140 is held in angular position between the spanner rollers 120 and the sides of the standoff brackets 128 by a guide rod 160 extending upwardly from the top of the clevis 140 and extending through a guide block 162 mounted on the upper surface of mounting bracket 103 centered over a clearance hole formed in the mounting bracket through which the guide rod 160 extends.

The second actuator assembly 54 is mounted to the first actuator assembly 50 by a pair of standoff blocks 168 mounted to the upper and lower cross members 74 and 76 of the carriage 72. Bolts 170 extend through clearance holes formed in the mounting plate 96 to engage through clearance holes formed in the standoff blocks 168 to engage threaded holes formed in the carriage upper and lower cross members 74 and 76.

Figure 5A:
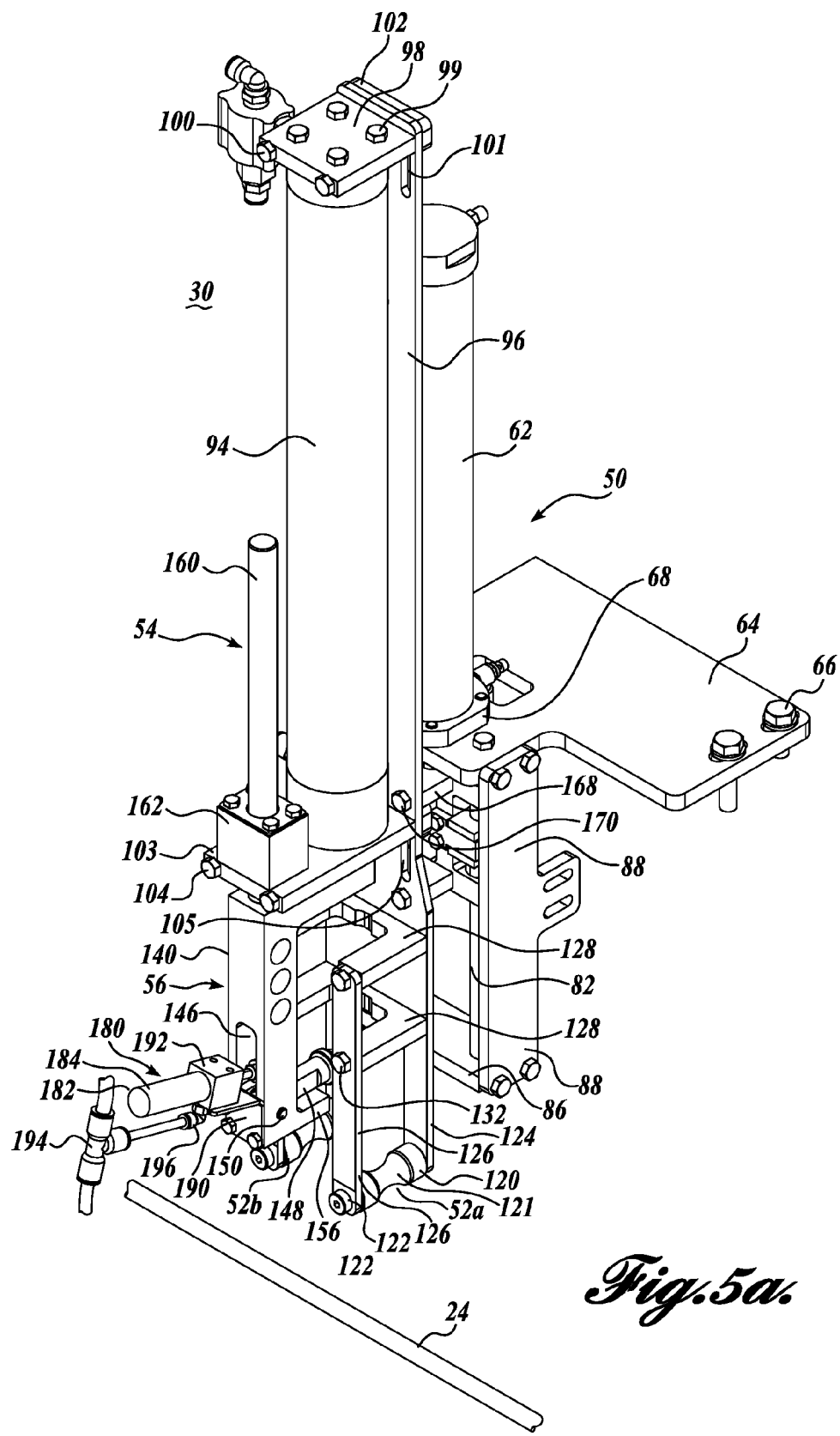
FIG. 5a is an isometric view of the casing extender shown in FIG. 3a, with the apparatus in upward retracted position.
Figure 6A:
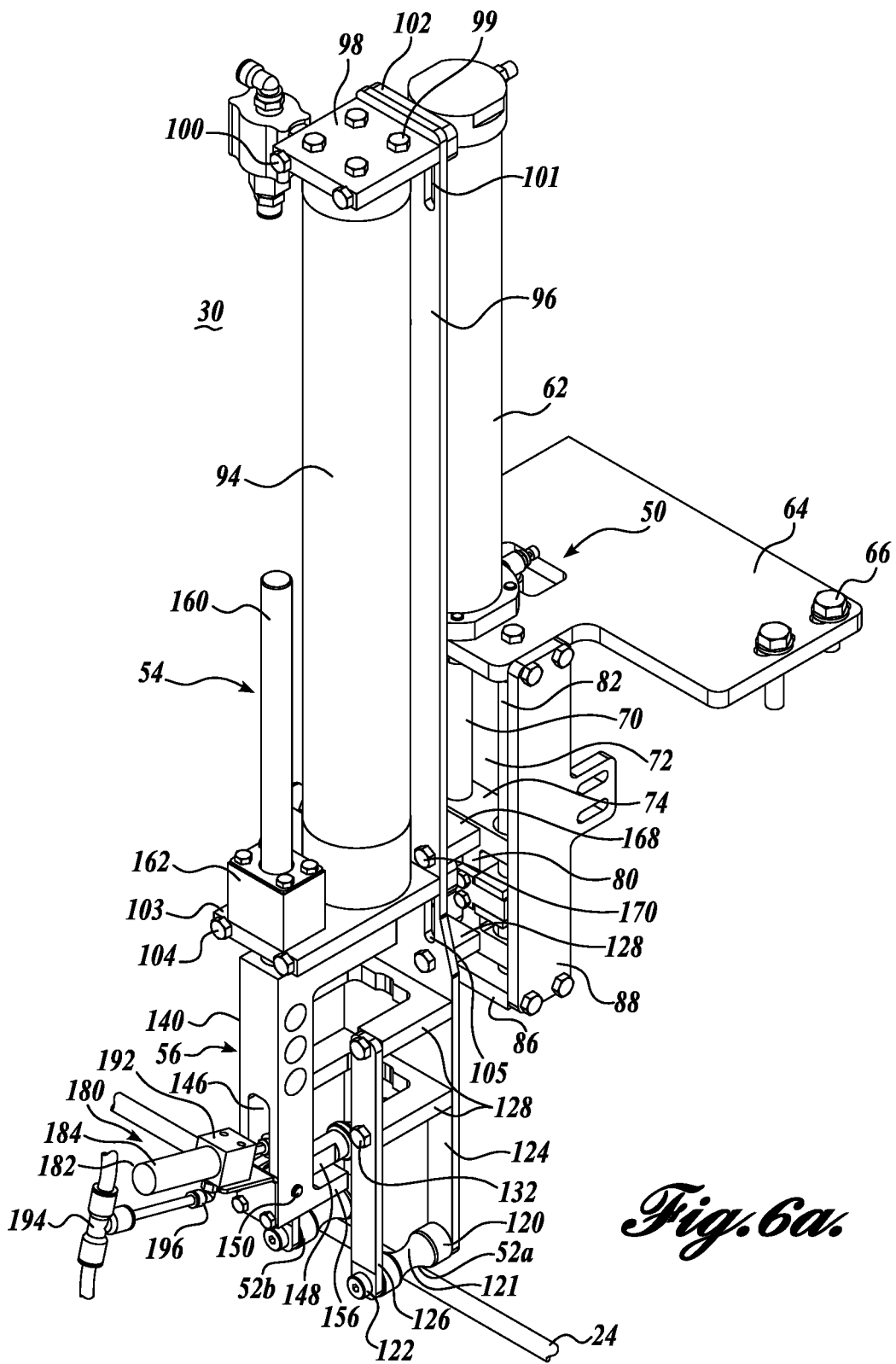
FIG. 6a is an isometric view of the casing extender as shown in FIG. 3, with the extender shifted downwardly into position adjacent the gathered casing rope.
Figure 6B:
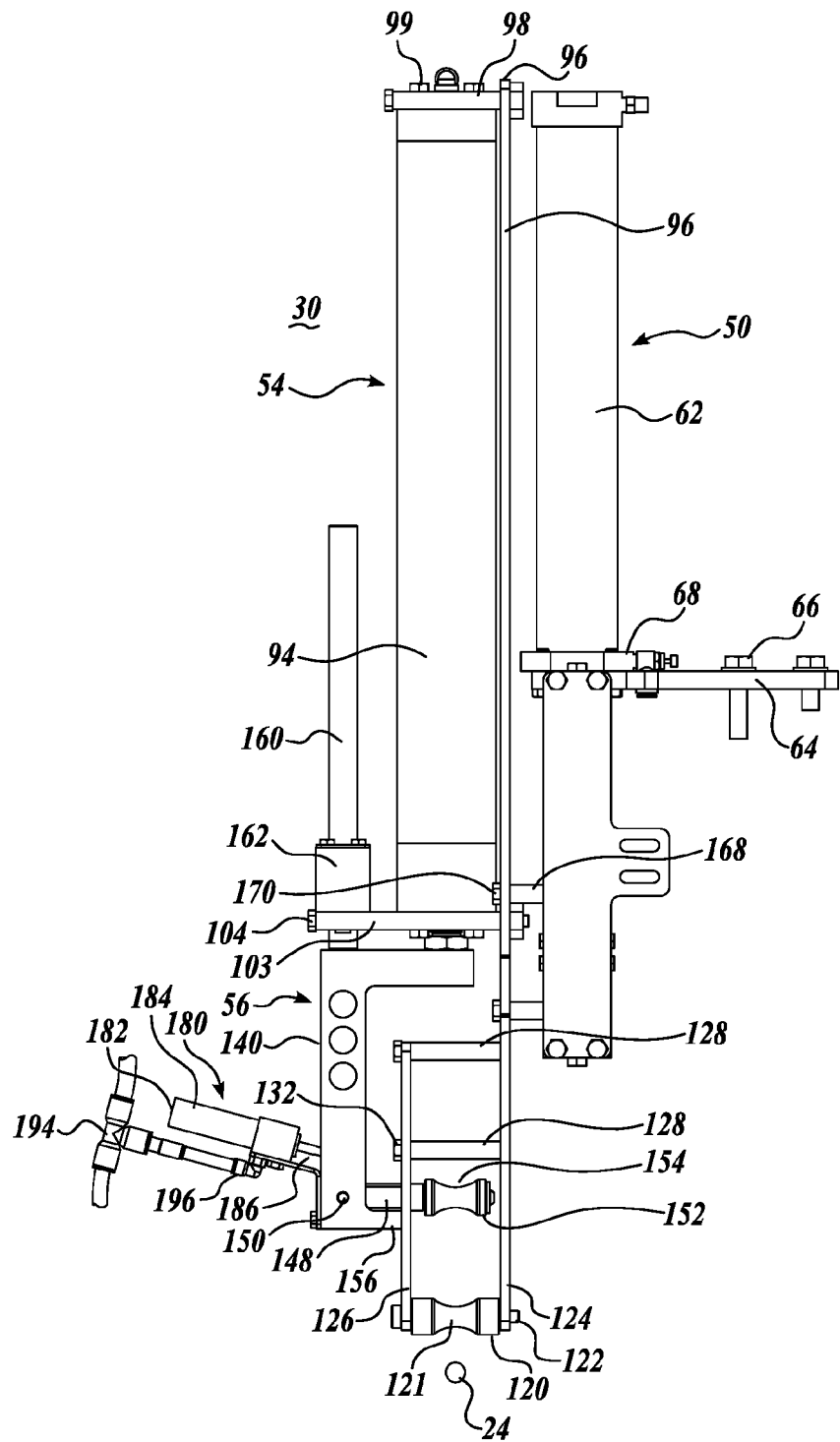

To briefly discuss the operation of the slack casing extender apparatus 30, when the product log 18 has been formed and then the downstream voider plate pair 22 has been shifted downstream from the upstream voider plate pair 20, a length of gathered slack casing 24 extends between the two voider plate pairs. Thereupon, the first actuator assembly, which had been retracted upwardly away from the log 18 while the log was being formed, as shown in FIGS. 5a and 5b, is lowered to the position shown in FIGS. 6a and 6b so that the longitudinal rollers 120 of the spanners 52a and 52b are positioned just above the slack casing rope 24. It will be appreciated that at this point, the second actuator assembly 54 is in upward retracted position.

Figure 7B:
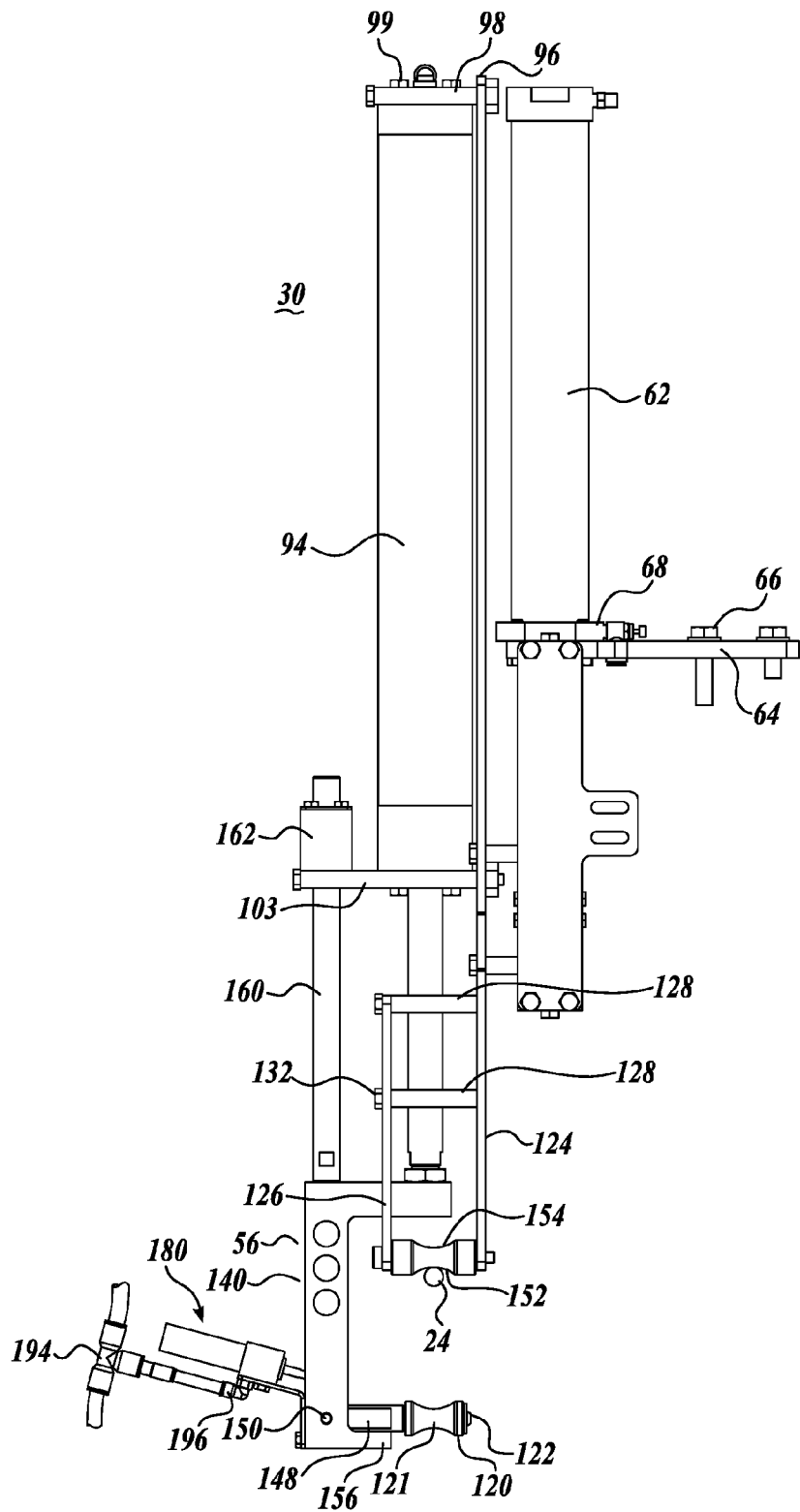
Figure 8A:
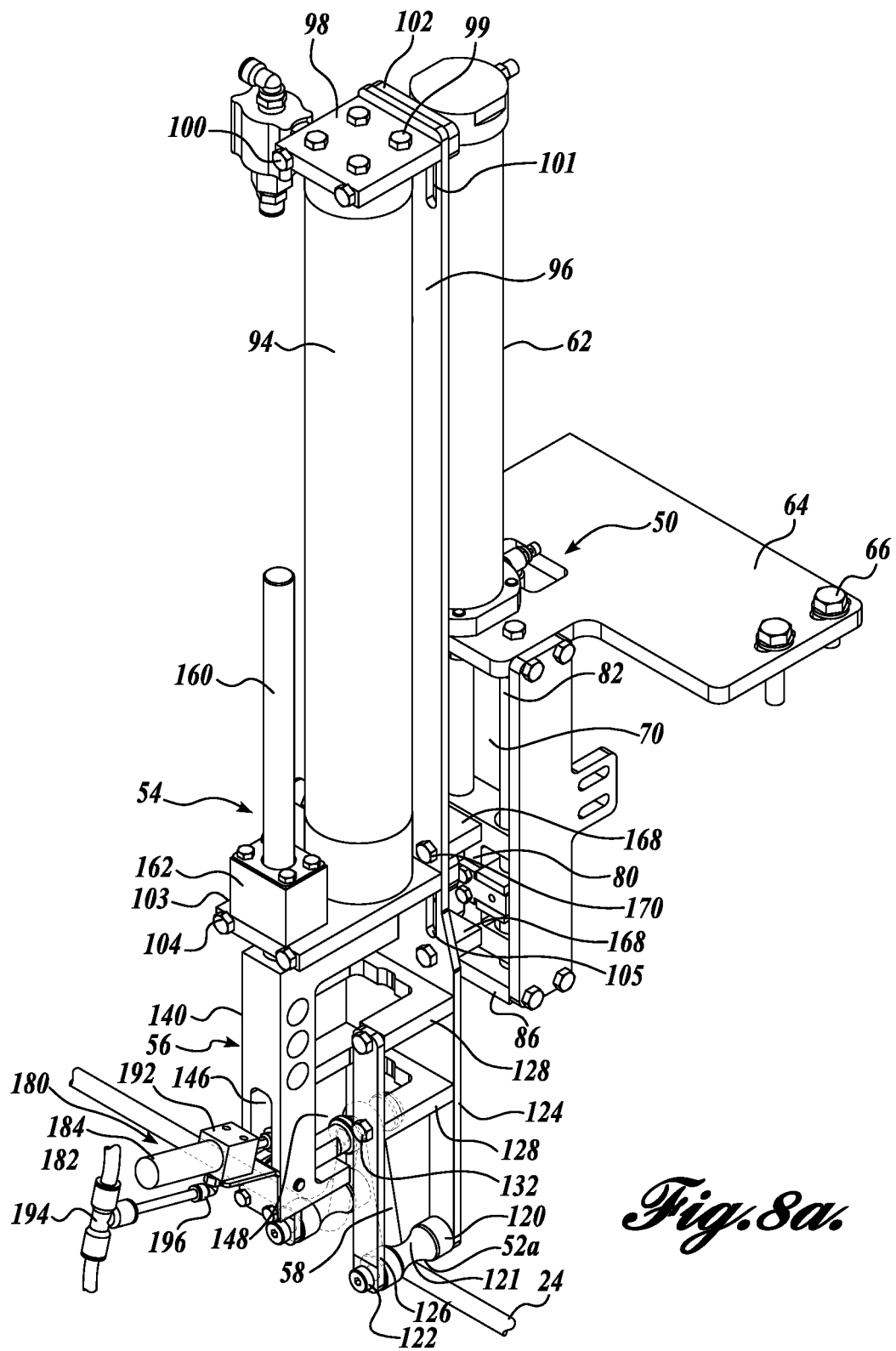
FIG. 8a is an isometric view of the casing extender of FIG. 3 with the length of casing rope being extended via the drawing member.
Figure 8B:
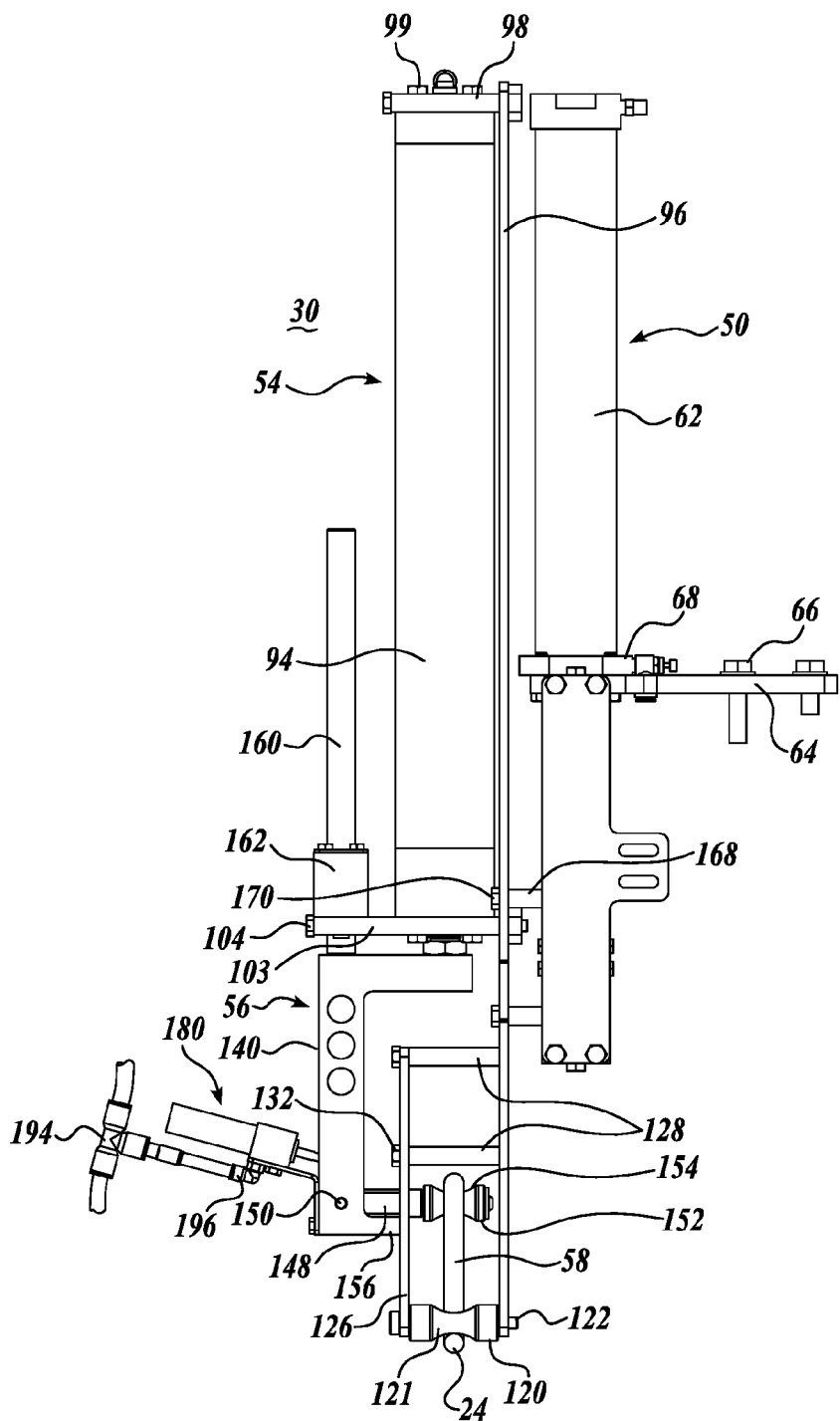

Next, the second actuator assembly 54 is activated so that the cylinder rod 144 is extended downwardly from the cylinder 94. It will be appreciated that during the extension of the cylinder rod 144, the roller 152 of the drawing member 56 will strike the upper surface of the slack casing rope 24 causing the pivot arm 146 to pivot about pivot pin 150 out of the way of the slack casing rope, and thereby allow the continued downward travel of the rod 144 and clevis 140. Once the roller 152 has cleared the slack casing rope 24, the roller 152 again resumes its horizontal position beneath the slack casing rope 24, as shown in FIGS. 7a and 7b.

Next, the cylinder 94 is retracted so that cylinder rod 144, together with the clevis 140 and drawing roller 152, move upwardly to cause the roller 152 to hook the underside of the slack casing rope 24. The clevis 140 together with its associated drawing roller 152 travel upwardly between the spanners 52a and 52b and centrally with respect to the standoff brackets 128. During this movement of the drawing member 56, a loop 58 is formed by the drawing roller 152 between the spanner rollers 120.

It will be appreciated that the length of the loop 58 that is formed by the casing extender 30 can be adjusted by adjusting the height of the second actuator assembly 54 relative to the first actuator assembly 50. As noted above, this is accomplished by adjusting the vertical height of the cylinder 94 relative to the mounting plate 96 by changing the location of the bolts 104 in slots 105 and bolts 100 in slots 101. In FIG. 3a, the cylinder 94 is located in its uppermost position relative to the mounting plate 96, thereby achieving the maximum height of the loop 58 and thus a maximum amount of extra slack casing rope 24. A lesser amount of extra slack casing rope can be achieved by lowering the cylinder 94 relative to the mounting plate 96.

Optionally, a return system 180 can be provided to help ensure that the drawing member 96 resumes its horizontal position after dropping below the slack casing rope 24. The return system includes an actuator 182 having a cylinder portion 184 and piston portion 186 extending therefrom. A pusher head 188 is mounted to the forward/distal end of the piston portion 186. The actuator 188 is mounted at a downward slope toward the drawing member 56 (when the drawing member is in horizontal orientation) by a mounting bracket 190 having a vertical leg secured to the bottom portion of the clevis 140 and a sloped upper surface on which the actuator 182 is mounted. The actuator 182 is extended and retracted by pressurized fluid that is routed to the control block 192 by a T fitting 194 engaging with a fluid coupling 196 at the bottom of the control block 192.

It will be appreciated that, depending on the direction that fluid enters the T fitting 194, the actuator 182 is operated to either extend or retract the piston 186. When the piston 186 is extended, the push head 188 presses against the adjacent side of the pivot arm 148 thereby to cause the pivot arm to assume its horizontal orientation as shown, for example, in FIG. 3*a*. Use of the return system 180 may be necessary if a cycle speed of the casing extender apparatus 30 is fast enough that the drawing member 56 does not assume its horizontal position in time simply by virtue of the weight of the roller 152 and pivot arm 148 tending to cause the drawing member 56 to assume a horizontal orientation.

While illustrative embodiments have been illustrated and described, it will be appreciated that various changes can be made therein without departing from the spirit and scope of the invention. For example, the actuator assemblies 50 and 54 have been described as utilizing fluid cylinders. Other types of linear actuators may be utilized instead, for example, electrical linear actuators, including brushless linear actuators.

In addition, rather than raising the drawing member 56 from above with cylinder 94, the drawing member may be pushed upwardly from below so as to form the loop 60 of the slack casing. Further, rather than operating the casing extender apparatus 30 in a vertical direction, the apparatus may be positioned at an angle from vertical, for example horizontally, or at an angle between vertical and horizontal.

As a further alternative, rather than increasing the length of the slack casing by creating a loop 60 therein, a pair of spanners could be engaged with the slack casing rope 24 so that one spanner is positioned on each side of the slack casing rope and then the spanners rotated about an axis extending between the spanners so as to wind the casing around the spanners, thereby creating additional slack casing length.

The embodiments of the invention in which an exclusive property or privilege is claimed are defined as follows:

1. In a packaging machine for packaging foodstuff ejected from a stuffing horn into a casing, an apparatus for increasing the length of slack casing extending between the stuffing horn on which the casing is sheared and a filled segment of the casing moved downstream from the stuffing horn, comprising:
   (a) a pair of spaced-apart spanner members;
   (b) an actuator system operable to position the pair of spaced-apart spanner members adjacent the slack casing and spaced-apart along the length of the slack casing;
   (c) a drawing member; and
   (d) the actuator system operable to move the drawing member laterally to the length of the slack casing and away from the spanner members to draw the casing off the stuffing horn as a loop in a direction away from the length of the slack casing.

2. The apparatus according to claim 1, wherein the drawing member is nominally positioned adjacent the spanner members.

3. The apparatus according to claim 2, wherein the actuator system draws the drawing member between the spanner members.

4. The apparatus according to claim 3, wherein the actuator system draws the drawing member in a direction transversely to the length of the slack casing.

5. The apparatus according to claim 1, wherein the spanner members comprise rollers to engage the slack casing.

6. The apparatus according to claim 5, wherein the drawing member comprises a roller to engage the slack casing.

7. The apparatus according to claim 1, wherein the drawing member comprises a roller to engage the slack casing.

8. The apparatus according to claim 1, wherein the actuator system comprises a first actuator operable to move the spanner members toward and away from the slack casing.

9. The apparatus according to claim 8, wherein the actuator system comprises a second actuator operable to move the drawing member laterally relative to the slack casing.

10. The apparatus according to claim 9, wherein the second actuator is adapted to be carried by the first actuator.

11. An apparatus for extending the length of slack casing at the end of a stuffed product log produced after the product has been stuffed into a casing at a stuffing location and then the product log has been advanced downstream a distance from the stuffing location to create a length of slack casing, the apparatus comprising:
   (a) a pair of spanners spaced apart from each other along the length of the slack casing, the spanners adapted to be moved from a retracted position spaced from the slack casing and an extended position adjacent the slack casing; and
   (b) a drawing assembly comprising an engagement portion operable to engage the slack casing and draw the slack casing as a loop between the spanners in a direction away from the length of the slack casing to increase the length of slack casing between the product log and the stuffing location.

12. The apparatus according to claim 11, wherein the engagement portion of the drawing assembly is nominally spaced away from the slack casing.

13. The apparatus according to claim 12, wherein the engagement portion of the drawing assembly is nominally disposed between the spanners.

14. The apparatus according to claim 11, wherein the drawing assembly comprises a drawing actuator that draws the slack casing away from the spanners.

15. The apparatus according to claim 11, wherein the engagement portion comprises a roller to engage the slack casing.

16. The apparatus according to claim 11, wherein the spanners comprise rollers to engage the slack casing.

17. The apparatus according to claim 11, further comprising a spanner actuator carrying the spanners between the retracted and extended positions.

18. A method for creating slack casing at the trailing end of a product stuffed into a continuous length of casing at a stuffing location, comprising:
   (a) positioning a pair of spanners spaced apart lengthwise of the casing upstream of the stuffed product and laterally adjacent to the casing;
   (b) drawing the casing as a loop between the spanners in a direction generated laterally to the casing length; and (c) clipping the casing at a location between the casing loop and the stuffing location.

19. The method according to claim 18, further comprising cutting the casing at a location upstream from the location that the casing has been clipped.

20. The method according to claim 18, further comprising after the casing has been stuffed, moving the spanners to a position laterally adjacent the casing from a location retracted from the casing.

* * * * *